United States Patent
Lu et al.

(10) Patent No.: US 10,520,772 B1
(45) Date of Patent: Dec. 31, 2019

(54) SELF-COMPENSATED LIQUID CRYSTAL POLYMER COATINGS ON CURVED OPTICAL SURFACE

(71) Applicant: Facebook Technologies, LLC, Menlo Park, CA (US)

(72) Inventors: Lu Lu, Kirkland, WA (US); Mengfei Wang, Seattle, WA (US); Fenglin Peng, Kirkland, WA (US); Wai Sze Tiffany Lam, Redmond, WA (US); Jacques Gollier, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 125 days.

(21) Appl. No.: 15/844,231

(22) Filed: Dec. 15, 2017

(51) Int. Cl.
*G02F 1/1337* (2006.01)
*G02B 27/01* (2006.01)
*G02F 1/1335* (2006.01)

(52) U.S. Cl.
CPC ... *G02F 1/133788* (2013.01); *G02B 27/0172* (2013.01); *G02F 1/133528* (2013.01); *G02B 2027/0178* (2013.01)

(58) Field of Classification Search
CPC .................................................. G02F 1/133788
See application file for complete search history.

(56) References Cited

U.S. PATENT DOCUMENTS

| | | | | |
|---|---|---|---|---|
| 5,706,131 A | * | 1/1998 | Ichimura | G02B 1/105 359/487.06 |
| 2001/0050758 A1 | * | 12/2001 | Suzuki | G02B 5/09 353/69 |
| 2002/0090086 A1 | * | 7/2002 | Van Rijnsoever | H04L 29/06027 380/207 |
| 2005/0036728 A1 | * | 2/2005 | Braunisch | G02B 6/00 385/14 |
| 2011/0227487 A1 | * | 9/2011 | Nichol | G02B 6/0018 315/158 |
| 2011/0273906 A1 | * | 11/2011 | Nichol | G02B 6/0076 362/607 |
| 2012/0218634 A1 | * | 8/2012 | Kim | H04N 13/337 359/466 |
| 2012/0293763 A1 | * | 11/2012 | Inoue | G02F 1/133788 349/178 |
| 2013/0342797 A1 | * | 12/2013 | Chiou | G02F 1/133528 349/123 |

(Continued)

*Primary Examiner* — Sang V Nguyen
(74) *Attorney, Agent, or Firm* — Morgan, Lewis & Bockius LLP

(57) ABSTRACT

A method disclosed herein includes applying a layer of photoalignment material on a non-flat optical surface, and exposing the layer of photoalignment material to alignment light that satisfies photoalignment criteria that are determined based on a representative thickness profile of a layer of liquid crystal material. The method also includes applying the layer of liquid crystal material over the layer of photoalignment material. Also disclosed is an optical element including a non-flat optical surface, a first layer of photoalignment material applied on the non-flat optical surface and a first layer of liquid crystal material. The layer of photoalignment material is aligned based on alignment light that satisfies photoalignment criteria that are determined based on a representative thickness profile of the layer of liquid crystal polymers.

20 Claims, 7 Drawing Sheets

(56) References Cited

U.S. PATENT DOCUMENTS

| | | | | |
|---|---|---|---|---|
| 2016/0377886 | A1* | 12/2016 | Quiroga | G02C 7/083 349/13 |
| 2017/0187004 | A1* | 6/2017 | Giraldo | H01L 51/5253 |
| 2018/0039141 | A1* | 2/2018 | Tseng | G02F 1/133711 |
| 2019/0002617 | A1* | 1/2019 | Kotani | C08F 290/126 |
| 2019/0094627 | A1* | 3/2019 | Sonoda | G02F 1/133723 |

* cited by examiner

US 10,520,772 B1

SELF-COMPENSATED LIQUID CRYSTAL POLYMER COATINGS ON CURVED OPTICAL SURFACE

TECHNICAL FIELD

This relates generally to optical elements, and more specifically to optical elements including liquid crystal polymer coatings used in head-mounted display devices.

BACKGROUND

Head-mounted display devices (also called herein head-mounted displays) are gaining popularity as means for providing visual information to a user. However, the size and weight of conventional head-mounted displays have limited applications of head-mounted displays.

SUMMARY

Accordingly, there is a need for head-mounted displays that are compact and light weight, and that produce images with high optical quality, thereby enhancing the user's virtual-reality and/or augmented reality experience.

Head-mounted display devices require a number of optical elements including, e.g., lenses, polarizers, and waveplates. Optical components made of liquid crystal polymers (LCPs) are desirable for head-mounted display devices due to their small size, light weight, low cost, durability, high optical quality, and in some occasions, tunability. However, conventional methods for making an LCP layer (e.g., by lamination) fail when applying an LCP layer on a non-flat surface (e.g., a spherical surface), and the applying result in a number of defects (e.g., wrinkles, or bubbles), which decrease the optical quality of the optical elements. Therefore, there is a need for methods of making non-flat optical elements including LCP layer.

The above deficiencies and other problems associated with non-flat LCP optical elements made by conventional methods are reduced or eliminated by the non-flat, self-compensated LCP optical elements described herein. In some embodiments, the non-flat LCP optical elements are included in a display device. In some embodiments, the device is a head-mounted display device. In some embodiments, the device is portable.

In accordance with some embodiments, a method includes applying a layer of photoalignment material on a non-flat optical surface, and exposing the layer of photoalignment material to alignment light that satisfies photoalignment criteria that are determined based on a representative thickness profile of a layer of liquid crystal material. The method also includes applying the layer of liquid crystal material over the layer of photoalignment material.

In accordance with some embodiments, an optical element is formed by the method described above.

In accordance with some embodiments, an optical element includes a non-flat optical surface, a first layer of photoalignment material applied on the non-flat optical surface, and a first layer of liquid crystal material. The first layer of photoalignment material is aligned based on first alignment light that satisfies photoalignment criteria that are determined based on a representative thickness profile of the first layer of liquid crystal material.

Thus, the disclosed embodiments provide the non-flat LCP optical elements with high optical quality, and methods of making such optical elements.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Figure 1:
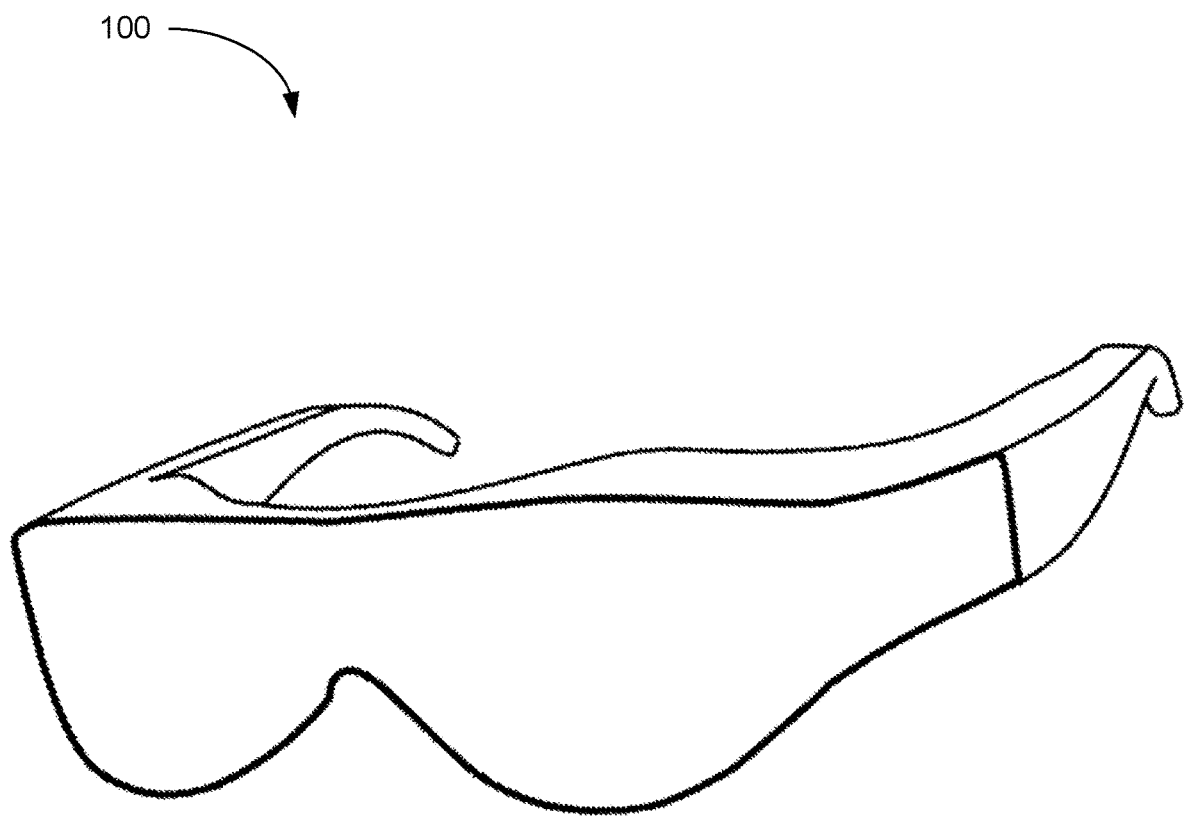
FIG. 1 is a perspective view of a display device in accordance with some embodiments.

These figures are not drawn to scale unless indicated otherwise.

DETAILED DESCRIPTION

Conventional head-mounted displays are larger and heavier than typical eyeglasses, because conventional head-mounted displays often include a complex set of optics that can be bulky and heavy. It is not easy for users to get used to wearing such large and heavy head-mounted displays.

Liquid crystal optical elements provide compact and light weight optical elements with properties comparable to or exceeding conventional lenses. However, there are challenges associated with making of non-flat optical elements with high optical quality. Conventionally, liquid crystal polymer (LCP) layers are applied on optical surfaces with a lamination process. However, applying a LCP layer on an optical surface which is non-flat (e.g., a spherical, an aspherical, a convex or a concave surface), the lamination process results in a number of artifacts (e.g., wrinkles, or bubbles). Such artifacts degrade optical properties of an LCP coating by, e.g., increasing scattering. Such artifacts also make it difficult to maintain a precise control of an optical axis (e.g., a fast axis) of an LCP layer across a curved surface. The deficiencies described herein are particularly significant when making optical surfaces that require high quality polarizations (e.g., half waveplates, quarter-wave plates, polarizers, photochromic polarizers and/or polarization beam splitter plates) on a non-flat optical surface. In a head-mounted display device, such deficiencies may affect brightness uniformity or contrast of a display. Other methods of applying of LCP layer (e.g., spin coating) avoid wrinkles and bubbles. However, applying a layer of LCP on a non-flat surface results in a non-uniform thickness profile of the layer of LCP. For example, the thickness of the LCP is higher near the edges compared to a thickness near the center due to a gravity effect.

LCP is a birefringent material. As used herein, the term birefringent refers to a property of a material having a refractive index that depends on the polarization and propagation direction of light. The birefringence ($\Delta n$) of a liquid crystal is described by the following equation $$\Delta n = n_e - n_o \qquad (1)$$

where $n_o$ is an optical index experienced by light with polarization being perpendicular to the optical axis of the crystal, and $n_e$ is an optical index experienced by light with polarization being parallel to the optical axis of the crystal. When there is an angle between the optical axis and the direction of the propagating light, the birefringence Δn is described by the following equation:

$$\Delta n = n_{eff} - n_o \quad (2)$$

where $n_{eff}$ is described by the following equation:

$$n_{eff}^2 = \frac{n_e^2 n_o^2}{n_e^2 \cos^2\theta + n_o^2 \sin^2\theta} \quad (3)$$

The present disclosure takes an advantage of birefringence characteristics of LCPs by providing an LCP layer with a variable refractive index on a non-flat surface. The method described herein provides non-flat optical elements with self-compensated coatings of LCP. The embodiments described herein have a refractive index varying across the LCP layer to compensate for the thickness variations of the layer. For example, the respective refractive index of an LPC layer is higher at positions where the thickness is less.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first layer could be termed a second layer, and, similarly, a second layer could be termed a first layer, without departing from the scope of the various described embodiments. The first layer and the second layer are both layers, but they are not the same layer.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user).

In some embodiments, display device 100 includes one or more components described below with respect to FIG. 2. In some embodiments, display device 100 includes additional components not shown in FIG. 2.

Figure 2:
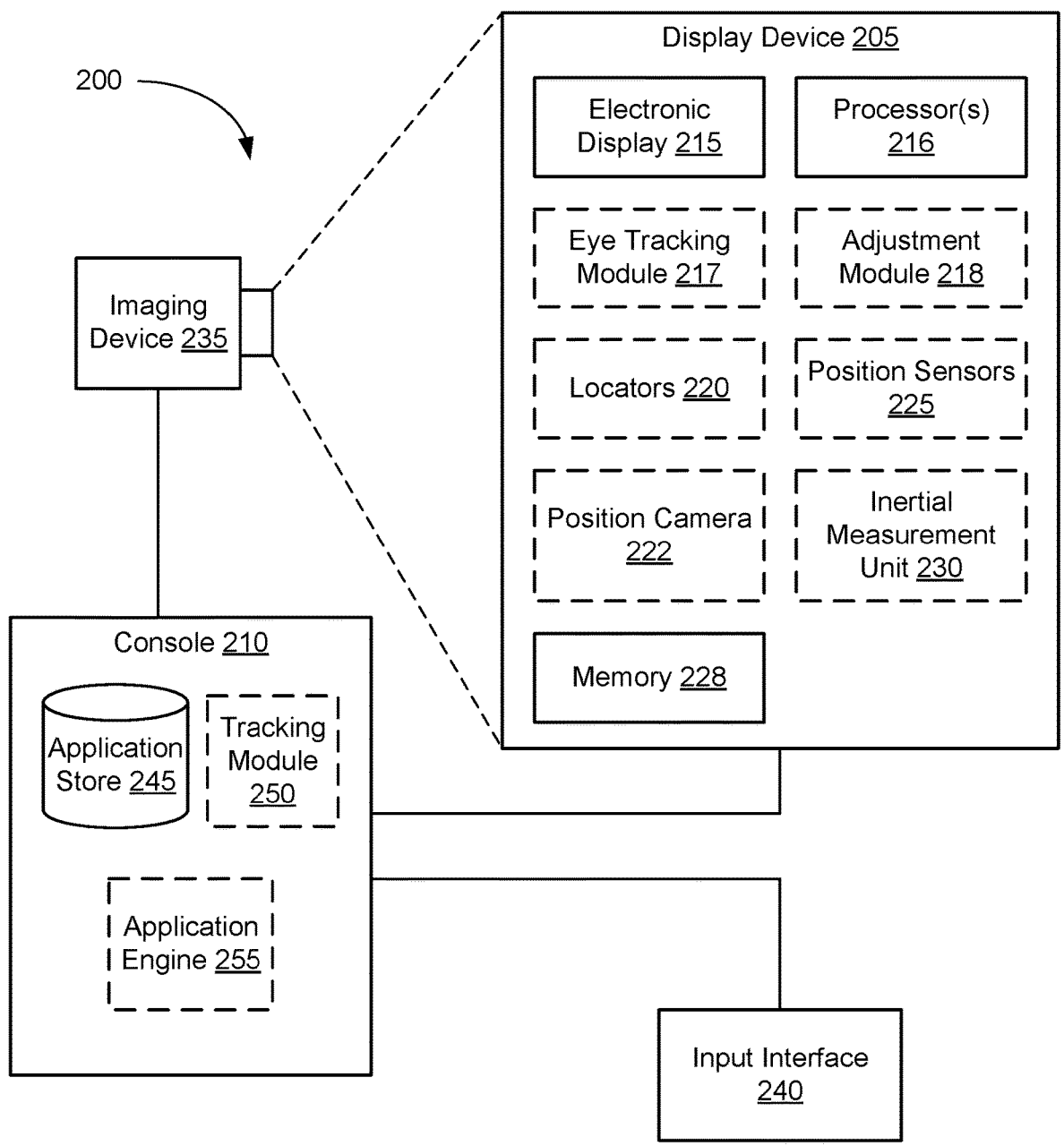
FIG. 2 is a block diagram of a system including a display device in accordance with some embodiments.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver virtual reality, mixed reality, and augmented reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 may operate as a virtual reality (VR) device, an AR device, as glasses or as some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable electronic display element or multiple adjustable electronic displays elements (e.g., a display for each eye of a user).

In some embodiments, the display element includes one or more light emission devices and a corresponding array of emission intensity array. An emission intensity array is an array of electro-optic pixels, opto-electronic pixels, some other array of devices that dynamically adjust the amount of light transmitted by each device, or some combination thereof. These pixels are placed behind one or more lenses. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, a laser, a fluorescent light source, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is also used to determine the location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. In some embodiments, this sends a discrete image to the display that will tile subimages together, thus, a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display not to pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

Inertial Measurement Unit (IMU) 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so that it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Optionally, imaging device 235 is configured to detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, a touch controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, educational applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 3:
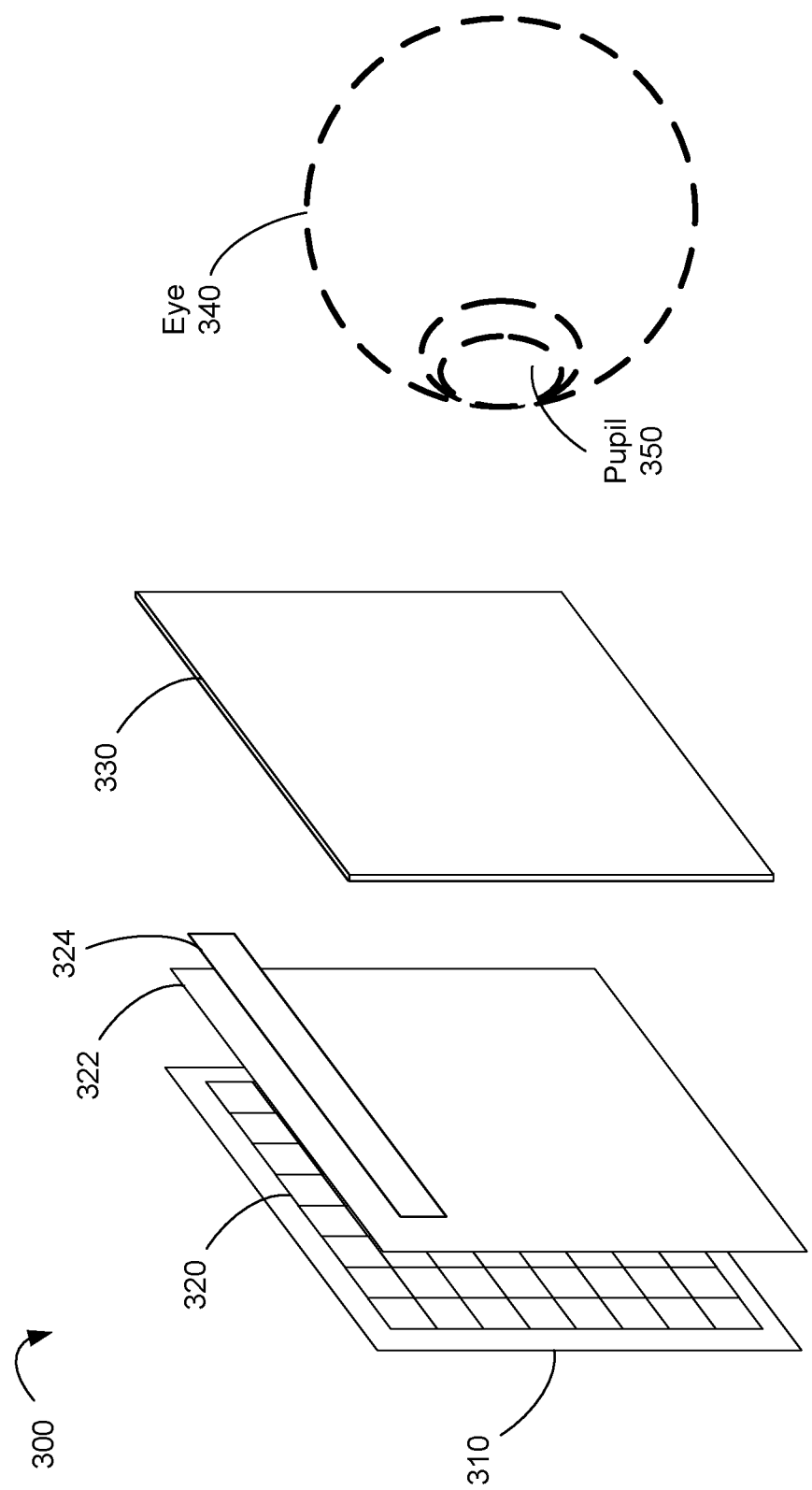
FIG. 3 is an isometric view of a display device in accordance with some embodiments.

FIG. 3 is an isometric view of display device 300 in accordance with some embodiments. In some other embodiments, display device 300 is part of some other electronic display (e.g., digital microscope, a mobile device, a smartphone etc.). In some embodiments, display device 300 includes light emission device array 310, and one or more lenses 330. In some embodiments, display device 300 also includes emission intensity array 322 and IR detector array 324.

Light emission device array 310 emits image light and optional IR light toward the viewing user. Light emission device array 310 may be, e.g., an array of LEDs, an array of microLEDs, an array of OLEDs, or some combination thereof. Light emission device array 310 includes light emission devices 320 that emit light in the visible light (and optionally includes devices that emit light in the IR).

Emission intensity array 322 is configured to selectively attenuate light emitted from light emission array 310. In some embodiments, emission intensity array 322 is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation and/or at some intermediate level of attenuation. In this manner emission intensity array 322 is able to control what portion of the image light emitted from light emission device array 310 is passed to the one or more lenses 330. In some embodiments, display device 300 uses emission intensity array 322 to facilitate providing image light to a location of pupil 350 of eye 340 of a user, and to minimize the amount of image light provided to other areas in the eyebox.

One or more lenses 330 receive the modified image light (e.g., attenuated light) from emission intensity array 322 (or directly from emission device array 310), and direct the shifted image light to a location of pupil 350.

Optional IR detector array 324 detects IR light that has been retro-reflected from the retina of eye 340, a cornea of eye 340, a crystalline lens of eye 340, or some combination thereof. IR detector array 324 includes either a single IR sensor or a plurality of IR sensitive detectors (e.g., photodiodes). In some embodiments, IR detector array 324 is separate from light emission device array 310. In some embodiments, IR detector array 324 is integrated into light emission device array 310.

In some embodiments, light emission device array 310 and emission intensity array 322 make up a display element. Alternatively, the display element includes light emission device array 310 (e.g., when light emission device array 310 includes individually adjustable pixels) without emission intensity array 322. In some embodiments, the display element additionally includes the IR array. In some embodiments, in response to a determined location of pupil 350, the display element adjusts the emitted image light such that the light output by the display element is refracted by one or more lenses 330 toward the determined location of pupil 350, and not toward other locations in the eyebox.

FIGS. 4A-4I are schematic diagrams illustrating a method of making a liquid crystal polymer optical element in accordance with some embodiments. First, a target phase retardation ($\varnothing_{target}(x, y)$) for an optical element is defined. The target phase retardation is a function of birefringence of an LCP layer ($\Delta n_{LC}$) and a thickness profile of the LCP layer ($d_{LC}(x,y)$), as defined by the following equations:

$$\varnothing_{target}(x,y) = \Delta n_{LC(x,y)} * d_{LC(x,y)} \quad (4)$$

$$d_{LC(x,y)} \sim f(x,y) \quad (5)$$

where birefringence of the LCP layer, $\Delta n_{LC}$, is a function of tilting angle $\alpha$ of respective liquid crystals, azimuthal angle $\beta$ of the respective liquid crystals of the LCP layer, and intensity I of an incident light. As used herein, tilting angle $\alpha$ refers to an angle defined by a liquid crystal polymer structure and a surface (e.g., a non-flat surface of a substrate), and azimuthal angle $\beta$ refers to a horizontal angle measured from a reference point on the surface (e.g., a center point of a circular substrate). The relationship is defined by the following equation:

$$\Delta n_{LC(x,y)} \sim f(\alpha(x,y), \beta(x,y), I(x,y)) \quad (6)$$

In order to make an optical element with a target phase retardation $\varnothing_{target}(x, y)$, a thickness profile $d_{LC}(x,y)$ of a corresponding LCP layer on a non-flat surface is determined. In some embodiments, the thickness of the LCP layer is determined by measuring a thickness profile of a reference LCP layer on the non-flat surface, where the reference LCP layer has identical properties to the LCP layer of the optical element being made by the method described herein. For example, the reference LCP layer is composed of the same one or two materials, and applied with the same predefined application parameters (e.g., by spin coating under similar conditions including spinning speed and temperature). In some embodiments, the thickness profile $d_{LC}(x,y)$ is obtained based on a predefined condition for applying the LCP layer. For example, based on prior knowledge, applying an LCP layer under certain predefined conditions results in a known thickness profile based on prior knowledge.

Based on the determined thickness profile $d_{LC}(x,y)$ and the target phase retardation ($\varnothing_{target}(x, y)$), photoalignment criteria $C_{PA}$ corresponding to the birefringence of a liquid crystal, $\Delta n_{LC}$, is obtained (see, equation 4 above). The photoalignment criteria CPA specify conditions for photoalignment of the LCP by defining incident angles $\theta(x, y)$, intensity I (x,y), and the direction of linear polarization P(x,y) for a photoalignment light at a respective position on the LCP layer, by the following equation:

$$C_{PA} \sim f(\theta(x,y), I(x,y), P(x,y)) \quad (7)$$

Figure 4A:
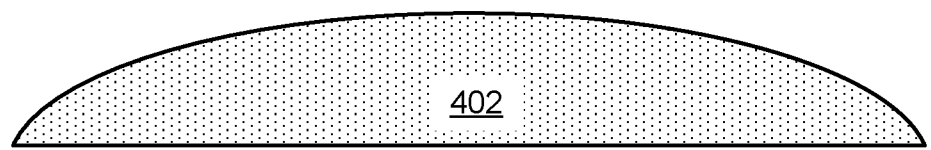
FIGS. 4A-4I are schematic diagrams illustrating a method of making a liquid crystal polymer optical element in accordance with some embodiments.

FIG. 4A illustrates substrate 402 with at least one non-flat optical surface. In some embodiments, the non-flat surface is a symmetric non-flat surface (e.g., a concave, a convex, a spherical, an aspherical, an elliptical, an inversely elliptical, a conical, a prism, or a pyramidal surface). In some embodiments, the surface is asymmetric. In some embodiments, the non-flat surface of substrate 402 includes one or more patterns (e.g., optical surface with a wave pattern). In some embodiments, substrate 402 is a concave or a spherical lens. Substrate 402 is made of an optical material (e.g., a substrate made of glass, such as N-BK7, N-SF11, or F2; barium borate; barium fluoride; magnesium fluoride; sapphire; calcium fluoride; fused silica; calcite; or a plastic, such as polymethyl methacrylate (PMMA) or polycarbonate; etc.).

Figure 4B:
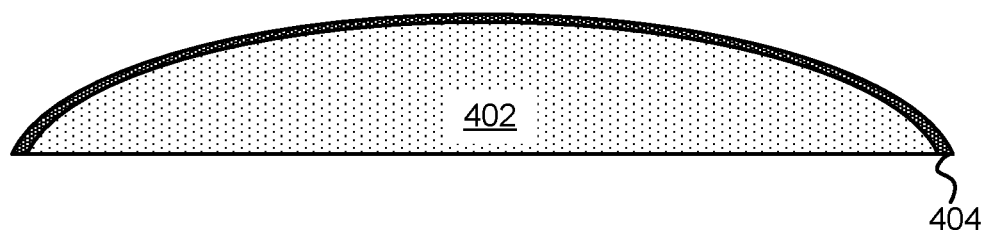
Figure 4C:
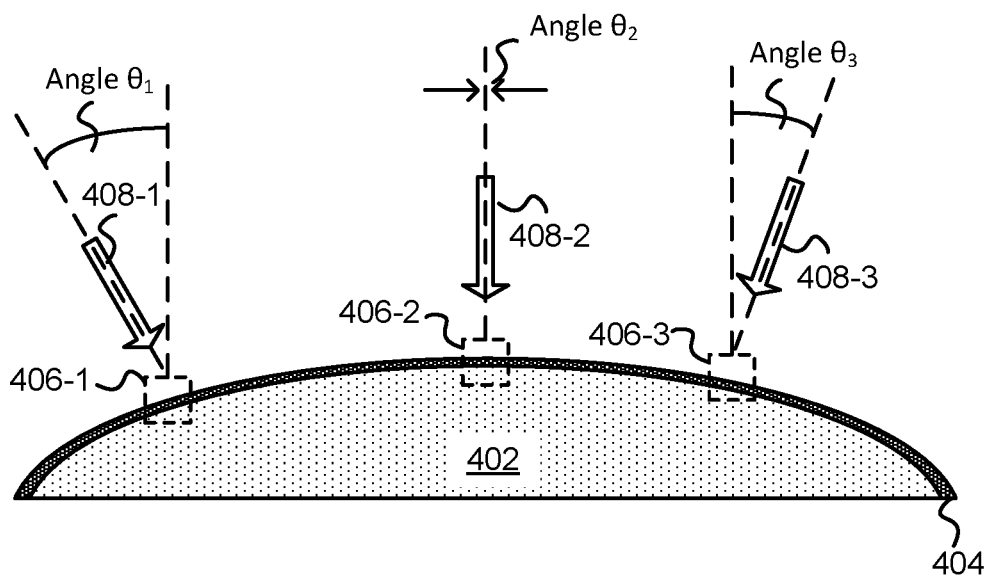

In FIG. 4B, photoalignment material (PAM) layer 404 is added on the non-flat surface of substrate 402. PAM layer 404 includes one or more PAMs (e.g., one or more PAMs supplied by Rolic®, Sigma Aldrich®, and/or DIC Corporation). The one or more PAMs include organic and/or inorganic compounds with photosensitive groups. Such materials include, for example, small molecule azo-compounds, azo-polymers, polymer matrices with molecular dopants, sulfonated diazo-dyes, polyimides, polysilanes, polystyrene, polyesters, aromatic polymers, compounds with photosensitive groups of cinnate, coumarin, chalconyl, tetrahydrophthalide, and maleimide, diamond-like carbon films, chalcogenide glass, other PAMs, or some combination thereof. PAM layer 404 is then illuminated with an alignment light (e.g., alignment lights 408-1, 408-2 and 408-3), as illustrated in FIG. 4C. Alignment lights 408-1, 408-2, and 408-3 are linearly polarized (e.g., by a half-wave plate) and the direction of the respective linear polarizations defines the orientation of the resulting respective patterns of PAM on PAM layer 404 (i.e., azimuthal angle β). Lights 408-1, 408-2, and 408-3 are selected to satisfy photoalignment criteria CPA that is determined based on the target phase retardation $\varnothing_{target}(X, y)$ and the representative thickness profile $d_{LC}(x,y)$ of the layer of liquid crystal polymers. In FIG. 4C, position 406-1 of PAM layer 404 is exposed to alignment light 408-1, which has linear polarization ($P_1$), a first set of incident angles (e.g., incident angle $\theta_1$), and a first intensity ($I_1$), specified by the photoalignment criteria $C_{PA}$. Position 406-2 of PAM layer 404 is exposed to alignment light 408-2, which has linear polarization ($P_2$), a second set of incident angles (e.g., incident angle $\theta_2$), and a second intensity ($I_2$), specified by the photoalignment criteria. Position 406-3 of PAM layer 404 is exposed to alignment light 408-3 which has polarization ($P_3$), a third set of incident angles (e.g., incident angle $\theta_3$), and a third intensity (13), specified by the photoalignment criteria. Angles $\theta_1$, $\theta_2$, and $\theta_3$ are defined by an optical axis of respective lights 408-1, 408-2, and 408-3 and respective reference axes parallel to an optical axis of substrate 402. In FIG. 4C, angle $\theta_1$ is 60 degrees, angle $\theta_2$ is 0 degrees, and angle $\theta_3$ is 30 degrees.

Figure 4D:
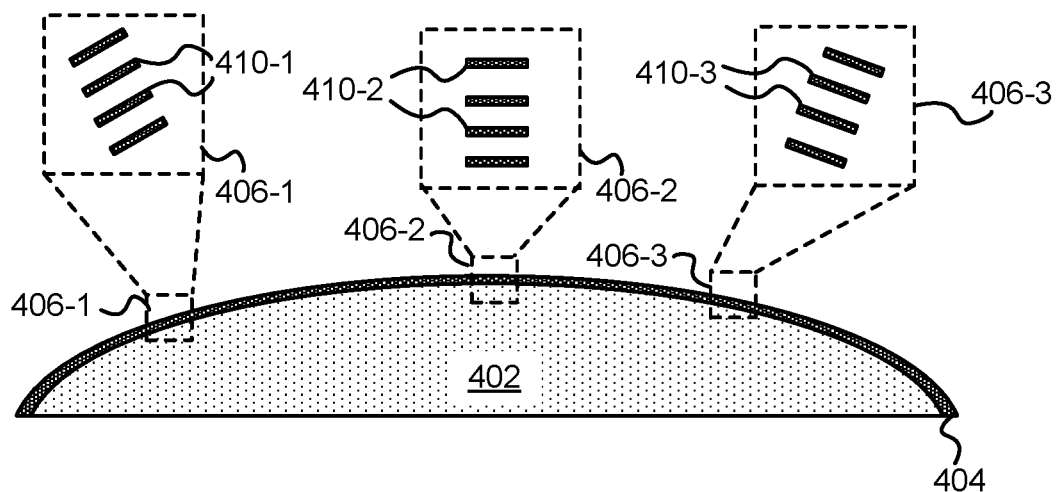

FIG. 4D illustrates PAM layer 404 after exposure to photoalignment lights 408-1, 408-2, and 408-3. As a result of photoalignment with lights 408-1, 408-2, and 408-3, each respective position 406-1, 406-2, and 406-3 have a distinctively aligned PAM layer. During photoalignment, PAM layer 404 forms ordered patterns of structures (e.g., structures 410-1, 410-2, and 410-3 illustrated in the insets of FIG. 4D). Each position 406-1, 406-2, and 406-3, after exposure to respective photoalignment light, has a respective ordered pattern of PAM. In FIG. 4D, structures 410-2 at position 406-2 (at a center point of substrate 402) are aligned horizontally along the surface of PAM layer 404, whereas structures 410-1 and 410-3 at respective positions 406-1 and 406-3 (away from the center point of substrate 402) are tilted with respect to the surface of PAM layer 404. The orientation of structures 410-1, 410-2, and 410-3 will define the orientation of liquid crystals that will be applied on top of PAM layer 404, as will be demonstrated below with respect to FIG. 4G.

Figure 4E:
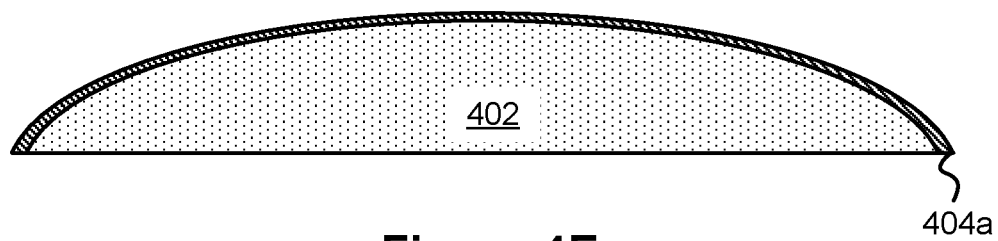
Figure 4F:
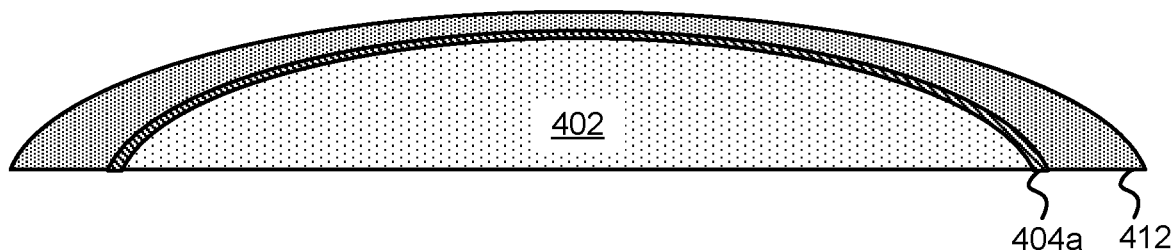

In some embodiments, during the photoalignment of PAM layer 404 described with respect to FIG. 4D, PAM layer 404 is cured. In some embodiments, PAM layer is cured after photoalignment, e.g., by exposure to an ultraviolet light. FIG. 4E illustrates cured PAM layer 404a over the non-flat surface of optical substrate 402.

Figure 4G:
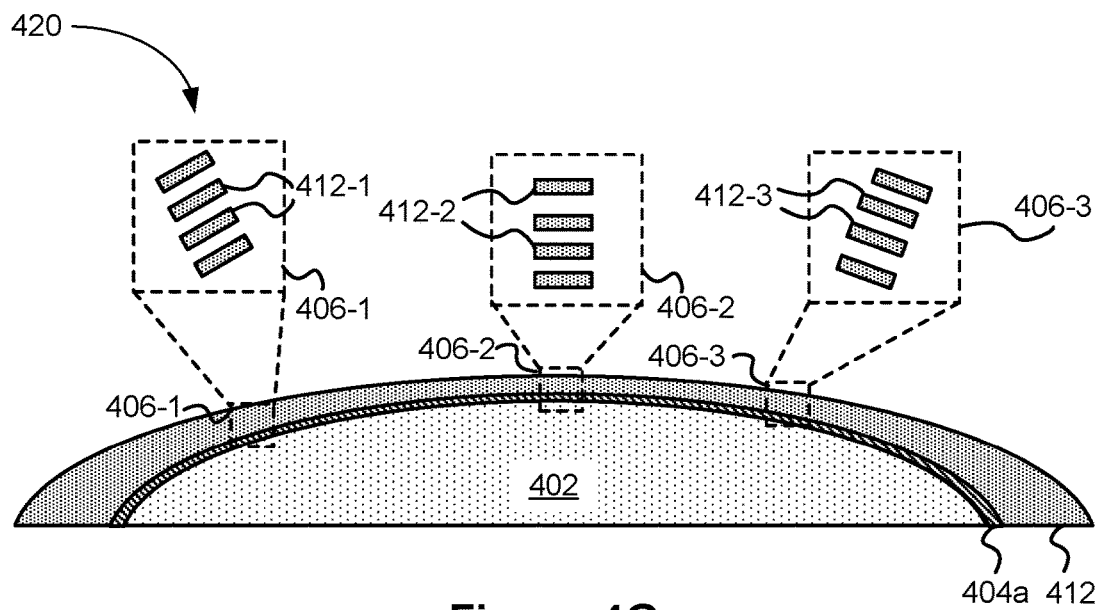
Figure 4H:
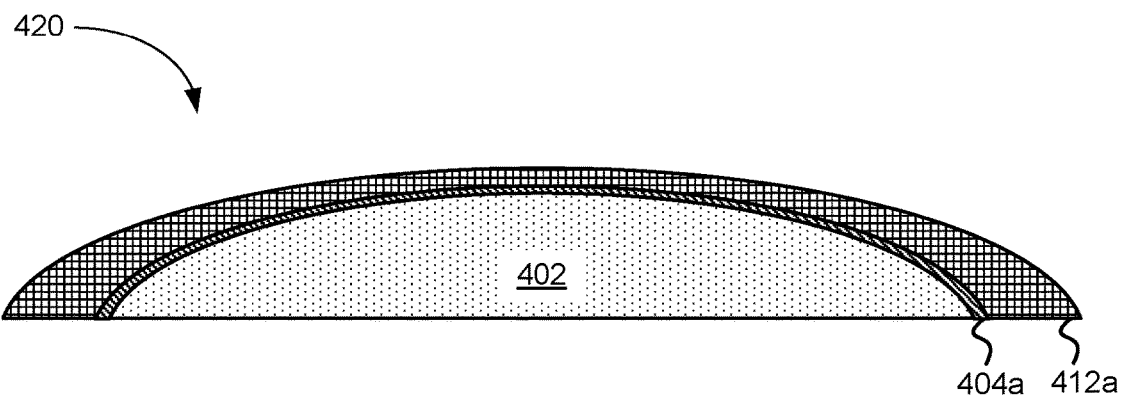

After the curing, layer of liquid crystal (LC) material 412 is applied over PAM layer 404. In some embodiments, LC layer 412 is applied by spin coating. LC layer 412 has a non-uniform thickness, as LC layer 412 is thinner in the vicinity of the center of substrate 402 and gradually thickens away from the center of substrate 402. In some embodiments, the thickness profile of LC layer 412 varies gradually. In some embodiments, the thickness of LC layer 412 varies non-uniformly (e.g., the thickness profile is wavy). LC layer 412 includes one or more mesogenic monomers (e.g., mesogenic monomers RM-257 or RM-82). In some embodiments, LC layer 412 optionally includes one or more additives (e.g., one or more solvents). The monomers of LC layer 412 form LCPs as they get exposed to and interact with structures of patterned PAM layer 404, as is illustrated in FIG. 4G. FIG. 4G is a schematic illustration of optical element 420 including PAM layer 404a and LC layer 412. The orientation of LCPs (e.g., LCPs 412-1, 412-2, and 412-3) are defined by the orientation of respective structures (e.g., structures 410-1, 410-2, and 410-3) of PAM layer 404 described above with respect to FIG. 4D. The respective orientations of LCPs 412-1, 412-2, and 412-3 are described by respective tilting angles $\alpha_1$, $\alpha_2$, and $\alpha_3$, and respective azimuthal angles $\beta_1$, $\beta_2$, and $\beta_3$. The orientation of the respective ordered crystal structures further define the birefringence of each respective position on LC layer 412, and further define the phase retardation $\varnothing_{target}(x, y)$ (see, Equation 4 above). The process described herein results in a LC layer with the target retardation properties $\varnothing_{target}(x, y)$. The target retardation compensates for the effect of thickness variation. In some embodiments, LC layer 412 is optionally cured (e.g., by ultraviolet curing and/or thermal curing). FIG. 4H illustrates cured LC layer 412a.

Figure 4I:
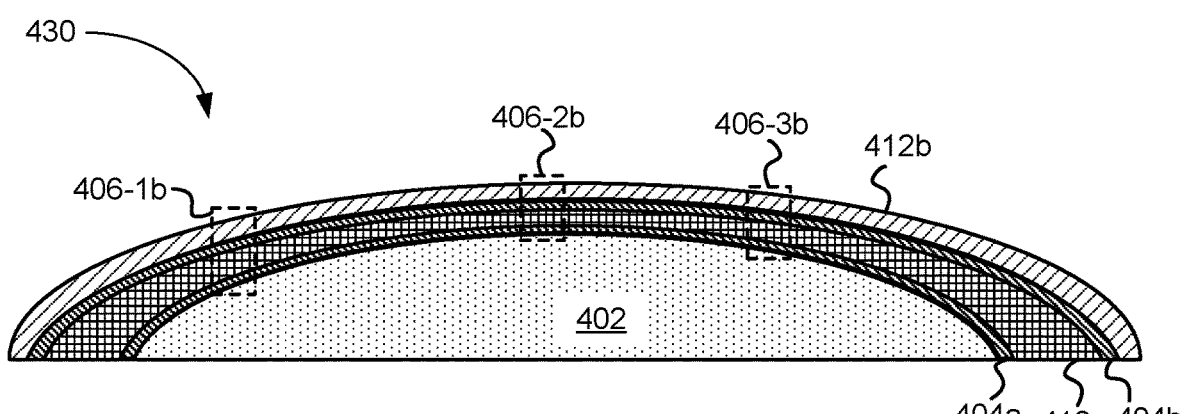

In some embodiments, the process described above with respect to FIGS. 4A-4H is repeated to form two or more layers of LC. FIG. 4I is a schematic illustration of optical element 430 with two layers of LC. In FIG. 4I, PAM layer 404b is applied over LC layer 412a, and LC layer 412b is applied over PAM layer 404b. In some embodiments, PAM layers 404a and 404b are composed of the same PAM compound. In some embodiment, PAM layers 404a and 404b are composed of different PAM compounds. In some embodiments, LC layers 412a and 412b are composed of the same LC material. In some embodiments, LC layers 412a and 412b are composed of different LC materials. In some embodiments, the orientation of LCPs of LC layer 412b (e.g., LCPs 412-1, 412-2, and 412-3 illustrated in FIG. 4G) in positions 406-1b, 406-2b, and 406-3b corresponds to the orientation of LCPs of LC layer 412a at respective positions 406-1b, 406-2b, and 406-3b. In such embodiments, the photoalignment conditions of layer 404a correspond to the photoalignment conditions (e.g., incident angle and intensity) of layer PAM 404b. In some embodiments, the orientation of LCPs of LC layer 412b is distinct from the orientation of LCPs of layer 412a (e.g., LCPs 412-1 illustrated in FIG. 4G) at position 406-1b. In such embodiments, the photoalignment conditions (e.g., incident angle and intensity) of PAM layer 404a are distinct from the photoalignment conditions of PAM layer 404b.

Figure 5:
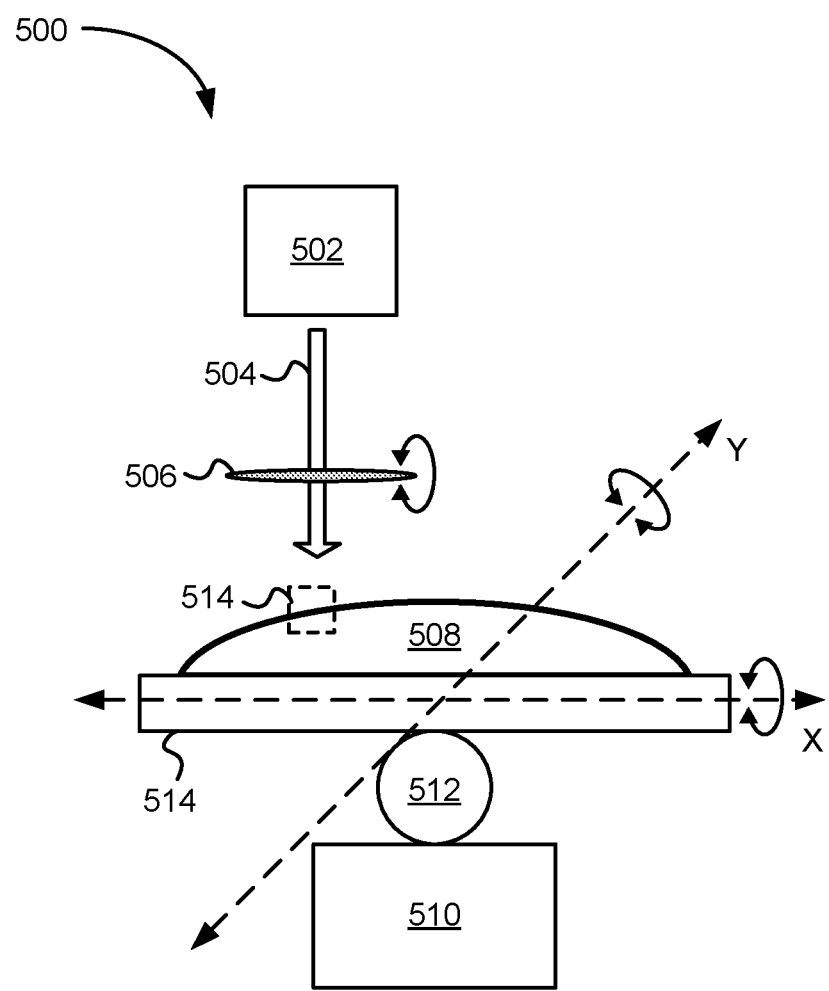
FIG. 5 is a schematic diagram illustrating a system for photoalignment in accordance with some embodiments.

FIG. 5 is a schematic diagram illustrating system 500 for photoalignment in accordance with some embodiments. System 500 includes stage 510 (e.g., a motorized x-y-stage) with mount 512 coupled with translational plate 514. Non-flat optical substrate 508 is positioned on top of translational plate 514. Non-flat optical substrate 508 corresponds to substrate 402 coated with PAM layer 404 as described above with respect to FIG. 4B. Plate 514 can be tilted in the x- and/or y-direction. Position 514 of optical substrate 508 is illuminated with light 504 emitted from light source 502. Half-wave plate 506 is positioned on the optical axis of light 504 to control the direction of polarization. The intensity of light 504 is controlled by light source 502. During photoalignment, substrate 508 is scanned across its surface to expose the surface area of substrate 508 to light 504. An incident angle of light 504 is controlled by tilting translational plate 514 in an x- and/or y-direction. The polarization of light 506 is controlled by rotating half-wave plate 506 to produce linearly polarized light with a direction satisfying the photoalignment criteria CPA. The intensity of light 504 is controlled, e.g., by adjusting power of emission by light source 502. The direction of linear polarization, incident angles and/or intensity of light 504 satisfy photoalignment criteria CPA for each position on surface of substrate 508.

In light of these principles, we now turn to certain embodiments.

In accordance with some embodiments, a method includes applying a layer of photoalignment material (e.g., PAM layer 404 in FIG. 4B) on a non-flat optical surface (e.g., non-flat surface of substrate 402), and exposing the layer of photoalignment material to alignment light that satisfies photoalignment criteria that are determined based on a representative thickness profile of a layer of liquid crystal material. The method also includes applying a layer of liquid crystal material over the layer of photoalignment material. For example, PAM layer 404 is exposed to photoalignment lights 408-1, 408-2, and 408-3 that satisfy photoalignment criteria $C_{PA}$. $C_{PA}$ are determined based on a representative thickness profile $d_{LC}(x,y)$ of LC layer 412 that is applied over PAM layer 404 in FIG. 4F.

In some embodiments, the method further includes determining the representative thickness profile of the layer of liquid crystal material (e.g., a thickness profile $d_{LC}(x,y)$ of LC layer 412.

In some embodiments, determining the representative thickness profile of the layer of liquid crystal material includes measuring a thickness profile of a reference layer of liquid crystal material on a reference non-flat optical surface. For example, the thickness profile $d_{LC}(x,y)$ of LC layer 412 is determined by measuring a thickness profile of a reference layer of LC material that corresponds to LC layer 412.

In some embodiments, the representative thickness profile of the layer of liquid crystal material is obtained based on a predefined condition for applying the layer of liquid crystal material on the non-flat optical surface. For example, the thickness profile $d_{LC}(x,y)$ of LC layer 412 is determined based on a predefined condition for applying a layer of LC material that corresponds to LC layer 412.

In some embodiments, the method further includes curing the layer of photoalignment material while the layer of photoalignment material is exposed to the alignment light (e.g., PAM layer 404a is cured in FIG. 4E). In some embodiments, the method includes curing the layer of liquid crystal material (e.g., LC layer 412a is cured in FIG. 4H).

In some embodiments, the photoalignment criteria specify incident angles and intensity of the light for a respective position on the non-flat optical surface. For example, photoalignment lights 408-1, 408-2, and 408-3 have intensity I and incident angles (represented by respective angles $\theta_1$, $\theta_2$, and $\theta_3$) that satisfy the photoalignment criteria $C_{PA}$ in FIG. 4C.

In some embodiments, the photoalignment criteria specify a first set of incident angles and a first intensity of the light for a first position on the non-flat optical surface (e.g., light 408-1 for position 406-1 on surface of substrate 402 in FIG. 4C), and a second set of incident angles and a second intensity of the light for a second position on the non-flat optical surface that is distinct from the first position (e.g., light 408-2 for position 406-2 on surface of substrate 402 in FIG. 4C). The first set of incident angles is distinct from the second set of incident angles and/or the first intensity of the light is distinct from the second intensity of the light.

In some embodiments, the photoalignment criteria specify a third set of incident angles and a third intensity of the light for a third position on the non-flat optical surface that is distinct from the first position and the third position (e.g., light 408-3 for position 406-3 on surface of substrate 402 in FIG. 4C). The third set of incident angles is distinct from the first set of incident angles and the second set of incident angles and/or the third intensity of the light is distinct from the first intensity of the light and the second intensity of the light.

In some embodiments, the layer of liquid crystal material is configured to provide a phase retardation that satisfies phase retardation variation criteria over at least a preselected portion of the non-flat optical surface. For example, LC layer 412 is configured to provide a target phase retardation $\emptyset_{target}(x, y)$ (e.g., Equation 4) that compensates for a thickness variation of LC layer 412 in FIG. 4G.

In some embodiments, the layer of liquid crystal material forms one of: a quarter wave-plate, a half wave-plate, and a polarizer (e.g., LC layer 412 in FIG. 4G forms a quarter wave-plate, a half wave-plate, or a polarizer).

In some embodiments, exposing the layer of photoalignment material to the alignment light includes scanning the layer of photoalignment material with alignment light that is adjusted based on an exposed position of the layer of photoalignment material and the representative thickness profile of the layer of liquid crystal material. For example, substrate 508 includes a layer of PAM that is scanned with alignment light 504 in FIG. 5. The alignment light 504 has an intensity, linear polarization, and incident angle based on a respective exposed position of substrate 508 and the corresponding thickness profile of the layer of LC material (e.g., LC layer 412 in FIG. 4G).

In accordance with some embodiments, an optical element is formed by the method described herein (e.g., optical element 420 illustrated in FIG. 4G).

In accordance with some embodiments, an optical element includes a non-flat optical surface (e.g., non-flat optical surface 402 in FIG. 4G), a first layer of photoalignment material applied on the non-flat optical surface (e.g., PAM layer 404a), and a first layer of liquid crystal material (e.g., LC layer 412). The first layer of photoalignment material is aligned based on a first alignment light (e.g., lights 408-1, 408-2, and 408-3 in FIG. 4C) that satisfies photoalignment criteria that are determined based on a representative thickness profile of the first layer of liquid crystal material (e.g., thickness profile $d_{LC}(x,y)$ of LC layer 412).

In some embodiments, the representative thickness profile of the first layer of liquid crystal material is a thickness profile of a reference first layer of liquid crystal material (e.g., a reference layer corresponding to LC layer 412 in FIG. 4G). In some embodiments, the photoalignment criteria specify incident angles and intensity of the light for a respective position on the non-flat optical surface (e.g., lights 408-1, 408-2, and 408-3 satisfy photoalignment criteria of respective positions 406-1, 406-2, and 406-3).

In some embodiments, the layer of liquid crystal material is cured (e.g., LC layer 412a is cured in FIG. 4H).

In some embodiments, photoalignment material for a first position on the non-flat optical surface is aligned in a first direction, and photoalignment material for a second position, that is distinct from the first position, on the non-flat optical surface is aligned in a second direction that is distinct from the first direction. For example, structures 410-1 of PAM layer 404 are aligned in one direction and structures 410-2 of PAM layer 404 are aligned in a second direction distinct from the first direction.

In some embodiments, photoalignment material for a third position, that is distinct from the first position and the second position, on the non-flat optical surface are aligned in a third direction that is distinct from the first direction and the second direction (e.g., structures 410-3 of PAM layer 404 are aligned in a third direction distinct from the first and second direction).

In some embodiments, the layer of liquid crystal material is configured to provide a phase retardation that satisfies phase retardation variation criteria over at least a preselected portion of the non-flat optical surface. For example, LC layer 412 is configured to provide a target phase retardation $\varnothing_{target}(x, y)$ (e.g., Equation 4) that compensates for a thickness variation of LC layer 412 in FIG. 4G.

In some embodiments, the optical element (e.g., an optical element illustrated in FIG. 4G) is one of: a quarter waveplate, a half wave-plate, and a polarizer.

In some embodiments, the optical element further includes a second layer of photoalignment material applied on the first layer of liquid crystal material (e.g., optical element 430 includes PAM layer 404b applied on LC layer 412a in FIG. 4I) and a second layer of liquid crystal material (e.g., LC layer 412b). The second layer of photoalignment material is aligned based on a second alignment light that satisfies photoalignment criteria that are determined based on a representative thickness profile of a second layer of liquid crystal material.

In some embodiments, the photoalignment material for a fourth position on the second layer of liquid crystal is aligned in a fourth direction (e.g., PAM layer 412b at position 406-1b is aligned in a fourth direction), and photoalignment material for a fifth position (e.g., PAM layer 412b at position 406-2b is aligned in a fifth direction), that is distinct from the fourth position, on the second layer of liquid crystal is aligned in a fifth direction that is distinct from the fifth direction.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
   applying a layer of photoalignment material on a substrate having a non-flat optical surface so that the layer of photoalignment material is located on the non-flat optical surface of the substrate and the layer of photoalignment material conforms to the non-flat optical surface of the substrate;
   subsequent to applying the layer of photoalignment material on the substrate, exposing the layer of photoalignment material to alignment light that satisfies photoalignment criteria that are determined based on a non-uniform thickness profile of a layer of liquid crystal material to be placed over the non-flat optical surface of the substrate; and
   applying the layer of liquid crystal material over the layer of photoalignment material.

2. The method of claim 1, wherein the non-flat optical surface is a curved optical surface.

3. The method of claim 1, further comprising:
   determining the non-uniform thickness profile of the layer of liquid crystal material, including measuring a thickness profile of a reference layer of liquid crystal material on a reference non-flat optical surface that corresponds to the non-flat optical surface.

4. The method of claim 1, wherein:
   the non-uniform thickness profile of the layer of liquid crystal material is obtained based on a predefined condition for applying the layer of liquid crystal material on the non-flat optical surface.

5. The method of claim 1, further comprising:
   curing the layer of photoalignment material while the layer of photoalignment material is exposed to the alignment light.

6. The method of claim 1, wherein:
   the photoalignment criteria specify incident angles and intensity of the alignment light for a respective position on the non-flat optical surface.

7. The method of claim 6, wherein:
   the photoalignment criteria specify a first set of incident angles and a first intensity of the alignment light for a first position on the non-flat optical surface;
   the photoalignment criteria specify a second set of incident angles and a second intensity of the alignment light for a second position on the non-flat optical surface that is distinct from the first position; and
   the first set of incident angles is distinct from the second set of incident angles and/or the first intensity of the alignment light is distinct from the second intensity of the alignment light.

8. The method of claim 7, wherein:
   the photoalignment criteria specify a third set of incident angles and a third intensity of the alignment light for a third position on the non-flat optical surface that is distinct from the first position and the third position; and the third set of incident angles is distinct from the first set of incident angles and the second set of incident angles and/or the third intensity of the alignment light is distinct from the first intensity of the alignment light and the second intensity of the alignment light.

9. The method of claim 1, wherein:

the layer of liquid crystal material is configured to provide a phase retardation that satisfies phase retardation variation criteria over at least a preselected portion of the non-flat optical surface.

10. The method of claim 1, wherein:

the layer of liquid crystal material forms one of: a quarter wave-plate, a half wave-plate, and a polarizer.

11. The method of claim 1, wherein:

exposing the layer of photoalignment material to the alignment light includes scanning the layer of photoalignment material with alignment light that is adjusted based on an exposed position of the layer of photoalignment material and the non-uniform thickness profile of the layer of liquid crystal material.

12. An optical element, formed by the method of claim 1.

13. An optical element, comprising:

a substrate having a non-flat optical surface;

a first layer of photoalignment material applied on the non-flat optical surface so that the first layer of photoalignment material is located on the non-flat optical surface of the substrate and the first layer of photoalignment material conforms to the non-flat optical surface of the substrate, wherein:

the first layer of photoalignment material is aligned based on first alignment light that satisfies photoalignment criteria that are determined based on a non-uniform thickness profile of a first layer of liquid crystal material to be placed over the non-flat optical surface of the substrate; and the first layer of liquid crystal material.

14. The optical element of claim 13, wherein:

the first layer of photoalignment material is cured.

15. The optical element of claim 13, wherein:

photoalignment material for a first position on the non-flat optical surface is aligned in a first direction; and photoalignment material for a second position, that is distinct from the first position, on the non-flat optical surface is aligned in a second direction that is distinct from the first direction.

16. The optical element of claim 15, wherein:

photoalignment material for a third position, that is distinct from the first position and the second position, on the non-flat optical surface is aligned in a third direction that is distinct from the first direction and the second direction.

17. The optical element of claim 13, wherein:

the first layer of liquid crystal material is configured to provide a phase retardation that satisfies phase retardation variation criteria over at least a preselected portion of the non-flat optical surface.

18. The optical element of claim 13, wherein:

the optical element is one of: a quarter wave-plate, a half wave-plate, and a polarizer.

19. The optical element of claim 13, further comprising:

a second layer of photoalignment material applied on the first layer of liquid crystal material so that the second layer of photoalignment material is located on the first layer of liquid crystal material, wherein:

the second layer of photoalignment material is aligned based on second alignment light that satisfies photoalignment criteria that are determined based on a non-uniform thickness profile of a second layer of liquid crystal material to be placed over the non-flat optical surface of the substrate; and the second layer of liquid crystal material.

20. The optical element of claim 19, wherein:

photoalignment material for a fourth position on the second layer of liquid crystal material is aligned in a fourth direction; and photoalignment material for a fifth position, that is distinct from the fourth position, on the second layer of liquid crystal material is aligned in a fifth direction that is distinct from the fourth direction.

\* \* \* \* \*